H. HENDERSON.
SHOCK LOADER.
APPLICATION FILED DEC. 5, 1916.

1,289,169.

Patented Dec. 31, 1918.
6 SHEETS—SHEET 2.

WITNESSES

INVENTOR
HENRY HENDERSON

ATTORNEYS

H. HENDERSON.
SHOCK LOADER.
APPLICATION FILED DEC. 5, 1916.

1,289,169.

Patented Dec. 31, 1918.
6 SHEETS—SHEET 5.

WITNESSES

INVENTOR
HENRY HENDERSON
BY
ATTORNEYS

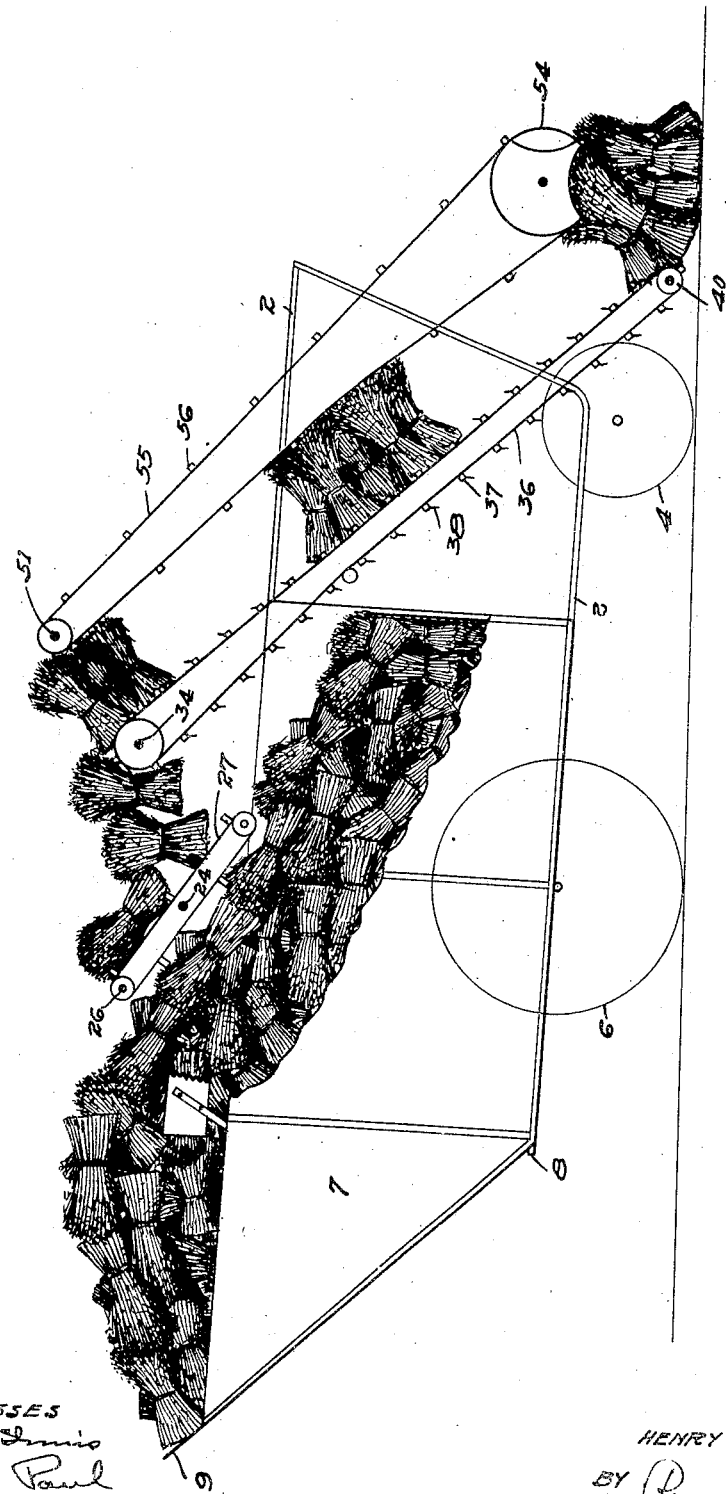

UNITED STATES PATENT OFFICE.

HENRY HENDERSON, OF HALSTAD, MINNESOTA.

SHOCK-LOADER.

1,289,169.   Specification of Letters Patent.   Patented Dec. 31, 1918.

Application filed December 5, 1916. Serial No. 135,203.

*To all whom it may concern:*

Be it known that I, HENRY HENDERSON, a citizen of the United States, resident of Halstad, county of Norman, State of Minnesota, have invented certain new and useful Improvements in Shock-Loaders, of which the following is a specification.

The object of my invention is to provide a machine for moving over the field and picking up bodily complete shocks of grain and delivering them to a suitable receptacle in the rear of the gathering mechanism.

A further object is to provide a loader having a pick-up mechanism so arranged that it will correspond as nearly as possible to hand work, the shocks being gently lifted and elevated with the bundles in substantially the same relative position, thereby avoiding unnecessary jarring or shaking of the bundles and the loss of grain.

A further object is to provide a loader having a pick-up apparatus and a receptacle which will collect any loose grain and carry it along with the bundles to the threshing machine.

A further object is to provide a loader of large capacity and one which can be operated at a comparatively small expense.

Other objects of the invention will appear from the following detailed description.

The invention consists generally in various constructions and combinations, all as hereinafter described and particularly pointed out in the claims.

In the accompanying drawings forming part of this specification,

Fig. 7 is a diagrammatic view of the machine.

Figure 1:
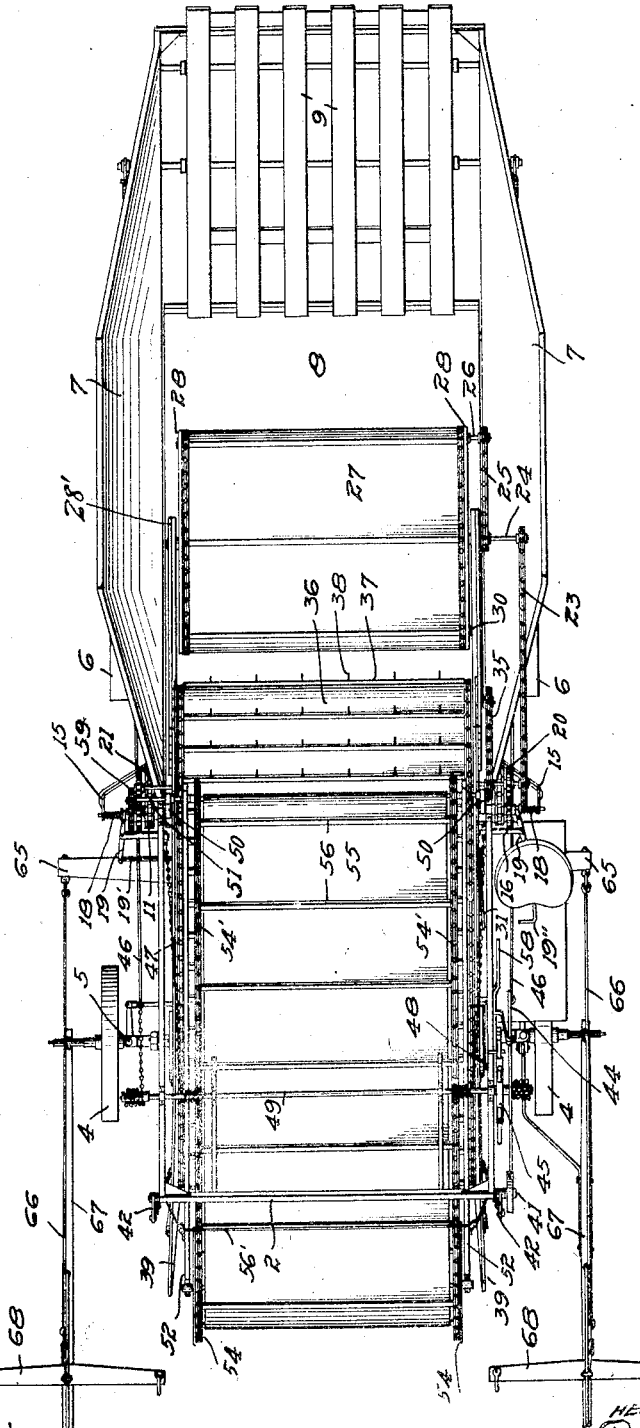
Figure 1 is a plan view of a shock loader embodying my invention.

In the drawing, 2 represents a suitable frame having a forward axle 3 and forward carrying and guiding wheels 4 having the well-known pivotal connection 5 with the axle for oscillating the wheels to steer the machine. 6 represents rear carrying and traction wheels supporting a bundle receptacle 7 having an open top through which the bundles are delivered, a tilting grain-tight bottom 8 and a hinged rear door 9. This bundle receptacle forms the subject-matter of a companion application and I make no claim, therefore, to the same herein, describing such parts as may be necessary to a clear understanding of the operation of the machine.

The rear wheels have sprockets 10 thereon and driving belts 11 connect these sprockets with sprocket wheels 12 having ratchet connections 13 with clutches 14. These ratchet connections or drives are of the well-known type which will operate to drive the mechanism of the machine when it is moving forward across the field, but allow the machine to back or turn without operating the gathering apparatus. The shaft 14 has bearings in the frame 2 and at each end in bars 15, and gears 16 have hubs 17 slidable on the shaft 14 and mounted for a clutching engagement with the clutches 14 of the ratchet hubs 13, being normally held toward said hubs by spring 18. Levers 19 are mounted on the frame for operating the hubs 17 and moving them into or out of engagement with the ratchet hubs 13 to render the gears 16 active or idle, as may be desired.

A rod 19' connects the levers 19 across the machine and a crank 19'' is provided under the driver's seat for rocking the arms 19 and operating the clutches, the arrangement being such that the gears 16 will be simultaneously moved into clutching engagement with the driving sprockets to set the aprons of the pick-up mechanism in operation.

The gears 16 mesh with gears 20 on a shaft 21 and a sprocket 22 on one end of said shaft is connected by a belt 23 with a shaft 24 which has a driving connection 25 with the shaft 26 of an apron 27 that is mounted in a frame 28 centrally pivoted on the shaft 24. This shaft has bearings in bars 28' which project in the rear of the elevating apron and overhang the bundle receptacle on each side. The apron 27 has cross slats thereon for engaging the bundles, but all teeth or pins which would tend to tear the bundles apart or carry them around on the apron are omitted. Coiled springs 29 have their ends mounted in bars 28' which are stationary and their other ends mounted in the frame 28 adjacent to its pivot, said spring operating to normally hold the frame and apron in a horizontal position, or substantially so. The function of this apron is to receive the bundles from the elevating apron and distribute them, first into the rear of the receptacle beneath and then to the forward portion thereof, as will hereinafter be more fully described.

Figure 2:
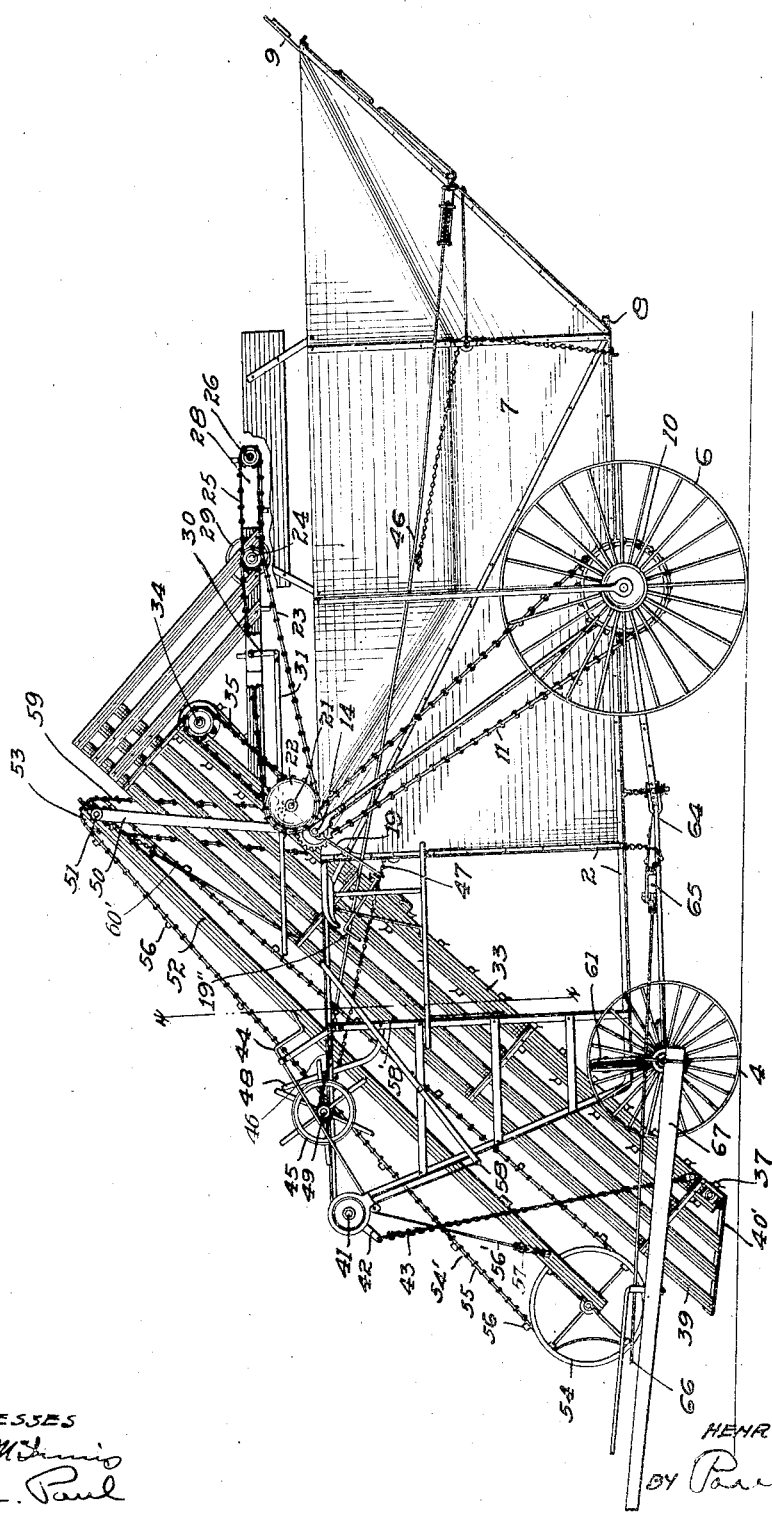
Fig. 2 is a side elevation of the same.

The frame in which the apron operates may be tilted to any desired angle by means of the link 30 and lever 31 (see Fig. 2), said lever extending to a point adjacent the driver's seat. This distributing apron may be adjusted in a substantially horizontal position when the bundle receptacle is empty to receive the bundles and direct them into the rear portion of the receptacle, and as the said receptacle fills, the apron may be tilted, as indicated in Fig. 7, to allow room for the accumulation of bundles beneath it and when desired, it may be tilted to such an angle that the bundles falling thereon will topple by gravity into the forward portion of the receptacle beneath the discharge end of the elevating apron. An elevating apron frame 33 is journaled to rock on the shaft 14 and has bearings at its upper end for a shaft 34 that is driven through a belt 35 from the shaft 21. An elevating apron 36 is mounted in the frame 33 and has the usual cross bars 37 and pins 38. This frame 33 also has bearings for the shaft 21. Suitable guards 39 are provided upon each side of the elevating apron. These guards extend along each side of the elevating apron and its frame and in the rear of the point of delivery of the distributing apron, and are fastened to the bars 28' and with these bars and the distributing apron form a counter-balance for the weight of the elevating apron and its frame on the opposite side of its shaft 14. The result is that the lower end of the elevating apron will tilt easily and ride over any obstruction or inequality in the ground; and not only this, but when the pick-up apron reaches a shock it will tilt slightly upon contacting with the bundles and gradually work forward under the shock and lift it without jarring or shaking the bundles. A roller 40 is provided at the lower end of the apron frame around which the apron passes, and the lower ends of the guard rails are provided with shoes 40' to contact with and slide on the ground. I have found in the actual operation of a machine of this type in the field that this elevating apron may be so nicely balanced that the picking up of a shock may be accomplished with perfect ease and with the bundles retained in substantially the same relative position that they occupied while the shock was standing on the ground.

A shaft 41 is mounted in the forward portion of the frame and is provided with arms 42 connected by chains 43 with the lower portion of the apron frame 33. A crank 44 has a worm gear connection with the shaft 41 for rocking the arms 42 and raising or lowering the elevator frame 33 on its axis to vary the distance of the pick-up elevator from the ground line. A wheel 45 is mounted on the frame and has a connection 46 with the door 9 and a flexible connection 47 with the floor of the receptacle, so that when the wheel is raised the floor may be allowed to tilt and the door 9 to swing backwardly and allow the discharge of the load in the receptacle. A locking device 48 is mounted on the frame in position to swing into the path of the spokes of the wheel 45 for holding it against premature movement. This device is within convenient reach of the driver's seat so that the operator of the machine can at any time desired discharge the contents of the receptacle. This wheel is preferably mounted on a shaft 49 (see Fig. 3) on which the flexible portion of the connections running to the door and the floor of the bundle receptacle are wound.

Figure 5:
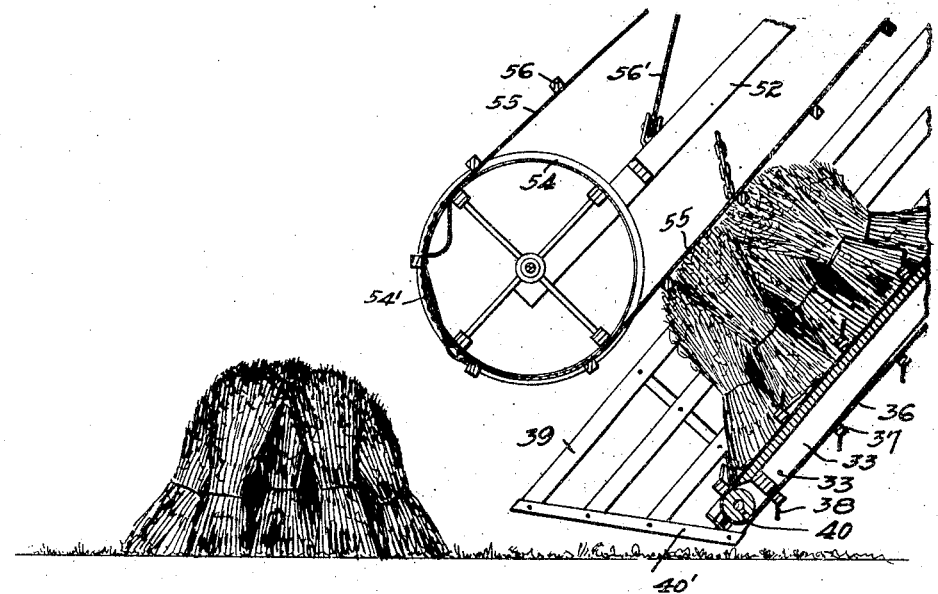
Fig. 5 is a detail view of the forward portion of the shock gathering mechanism.
Figure 6:
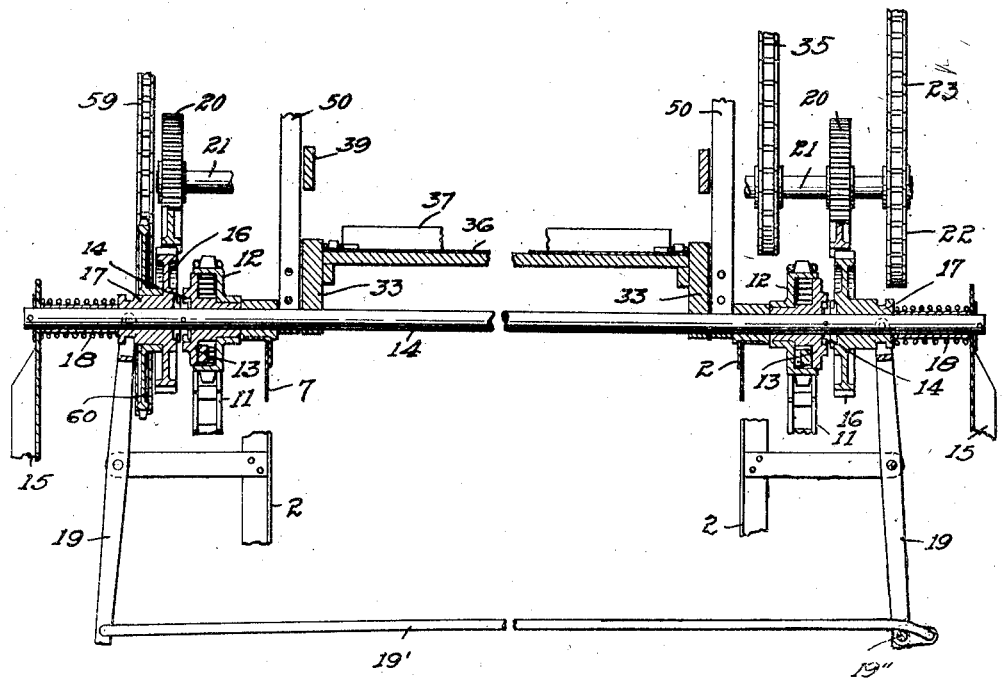
Fig. 6 is a detail sectional view on the line *y—y* of Fig. 4.

Journaled upon the shaft 14 are upright bars 50 having bearings at their upper end for a shaft 51 on which a frame 52 is mounted. Sprockets 53 are journaled on said shaft and a comparatively large reel 54 is mounted in bearings in the lower end of the frame 52 and on the sprockets 53 and the reel 54 chains 54' carrying an apron 55 are mounted and have slats 56 in position to contact with the top of the shock as it is picked up by the elevating apron. The upper apron with its frame has a forward and upward oscillating movement with the bars 50, and the position of the apron is changed by means of a cable 56' having a running connection at 57 with the frame and connected to an operating lever 58, also within convenient reach of the driver. When the pick-up apron approaches a shock it will lift the bundles bodily, as indicated in Fig. 5, the lower apron working in under the shock and the upper apron bearing on and working over the tops of the bundles with sufficient pressure thereon to prevent them from toppling over.

The upper or floating apron carried by the oscillating bars 50 and the cable 56 is free to oscillate toward and from the lower apron and when its lower end contacts with the upper portion of a shock it is moved forward and upward with a creeping or reaching movement and so attains its grasping position on the upper portion of the shock, the apron sections lying loose between the slats of the rail and yielding under the pressure of the bundles, so that the shock held at the top and bottom of the aprons will be gathered up bodily, the mechanism operating in a manner as nearly corresponding to hand work as possible, yielding when the shock offers resistance, the lower apron creeping in under the shock and the upper apron reaching forward and over the shock until it is loosely though firmly held in an elevating position where the bundles will not be crushed or shaken. The lower apron, however, is grain-tight, and should the bundles be very dry and some of the grain shake out, it will be carried by this belt to its discharge point and delivered to the bundle receptacle which, as heretofore stated, has a grain-tight floor. At the threshing machine the load is discharged onto a canvas so that any loose grain in the receptacle will be saved.

The lever 58 for controlling the adjustment of the upper apron preferably engages a toothed rack 58' by means of which the lever may be adjusted and locked to hold the apron at the desired elevation. This upper apron I prefer to operate through a belt 59 and sprocket wheel 60 on the gear 16, and the belt having the same axis as the arms 50, freedom of oscillation of the frame supporting the upper apron is permitted.

A connection 60' is provided (see Fig. 2) between the upper apron frame 52 and the guard rails 39 to prevent said upper frame from tilting backwardly too far on its supporting bars. These connections have an adjusting means so that the upper frame can be swung upwardly and forwardly with the bars 50 to increase, if desired, the distance between the upper apron and the lower one.

Figure 3:
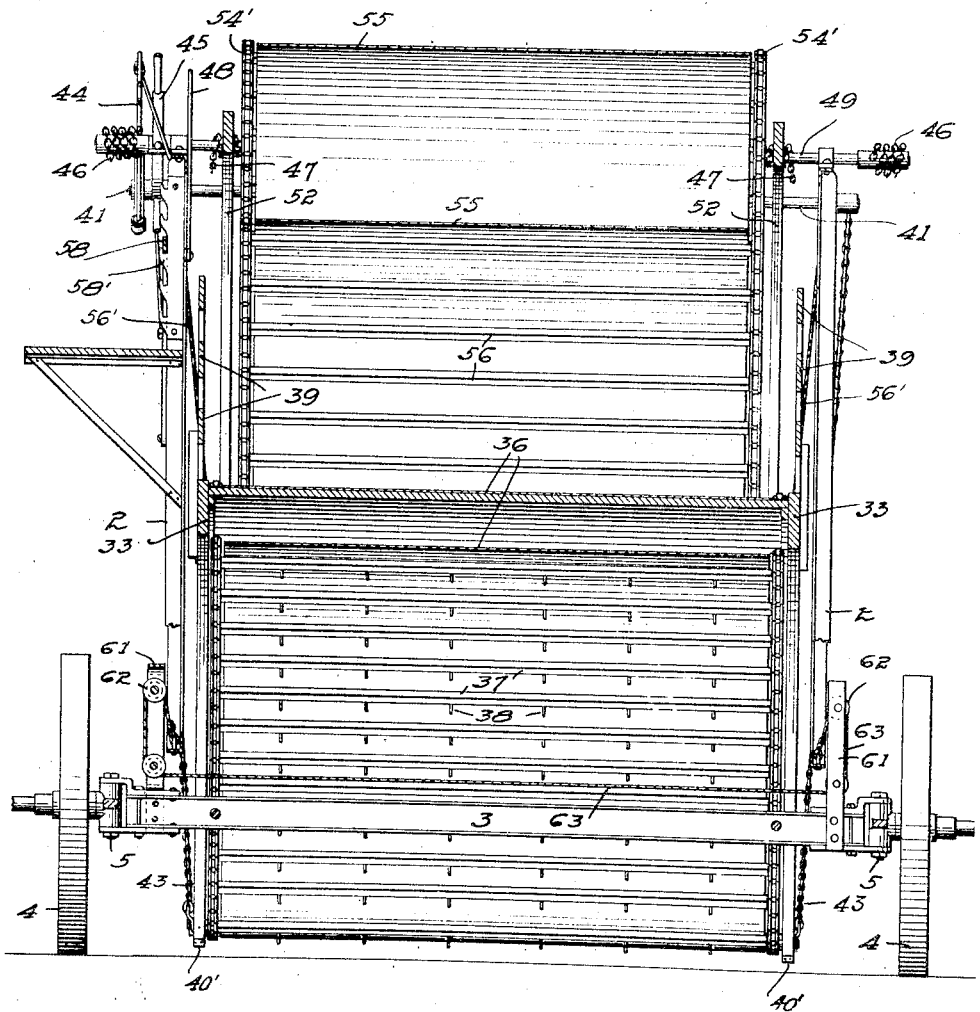
Fig. 3 is a vertical sectional view on the line *x—x* of Fig. 1.
Figure 4:
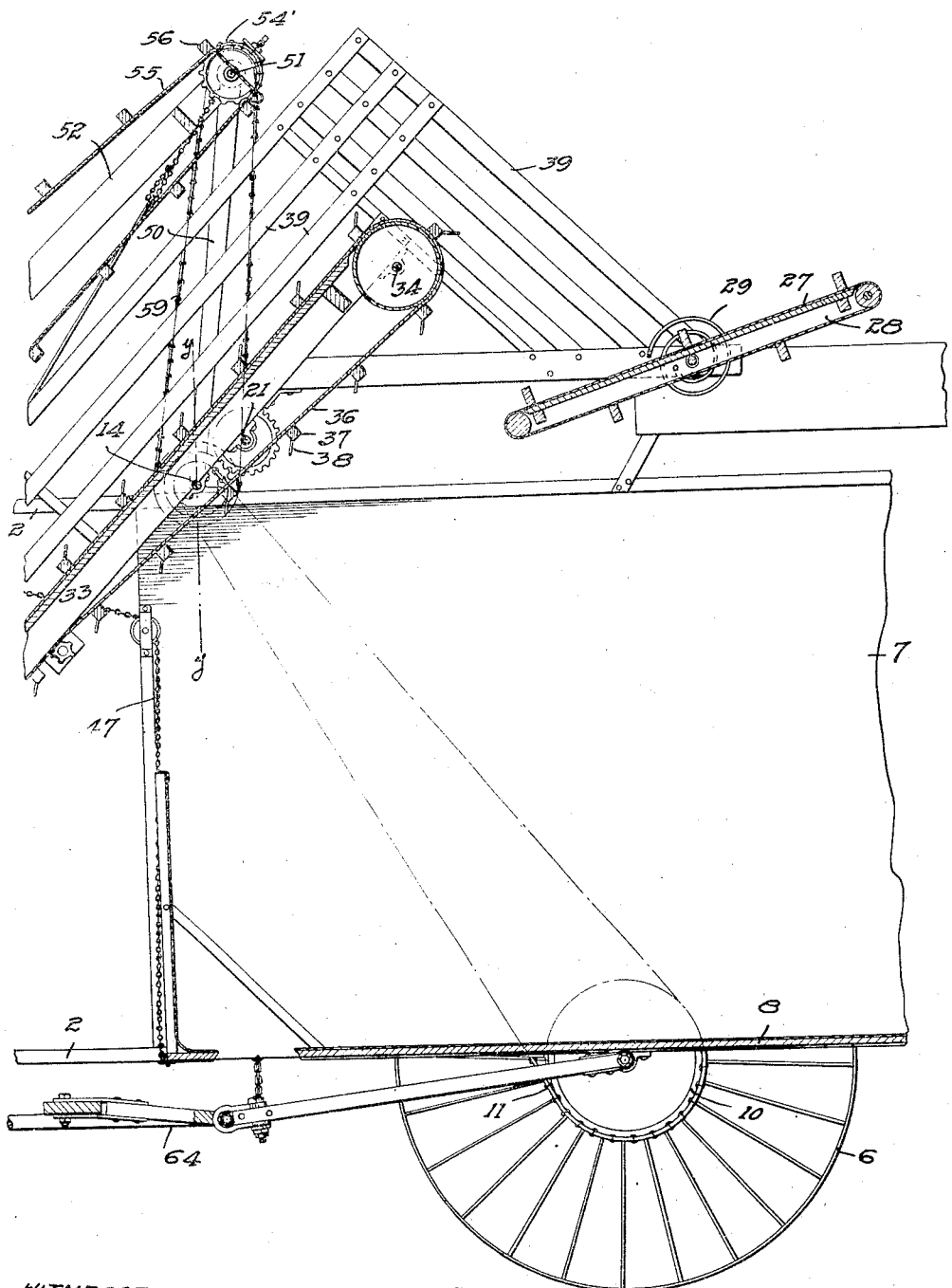
Fig. 4 is a vertical sectional view, taken on a section line running lengthwise of the machine and illustrating the apparatus for delivering the bundles to the receptacle.

As shown in Fig. 3, the axle 3 is provided with upwardly projecting standards 61 having sheaves 62, one above the other, therein, and a cable 63 is attached at its ends to the carrying frame of the machine and has a running connection with the axle through the sheaves and the supporting standards. This manner of mounting the frame on the axle permits a rocking movement on a longitudinal axis of the frame, allowing either side to rise and fall and accommodate itself to inequalities of the ground and also allows a corresponding movement to the apron frames and the gathering aprons carried thereby. A reach connection 64 is provided between the rear axle and the forward one and an evener bar 65 has draft connections 66 running fowardly on each side of the machine and poles 67 are provided on the forward wheels for steering the same. This mechanism I do not illustrate and describe in detail, as it forms the subject matter of a companion application.

In the operation of the machine, the pick-up apron and its frame, counter-balanced by the distributing apron and its supporting bars in the rear of the pivot of the elevating apron frame, will hang freely in the carrying frame and tilt readily upon contact with a shock to allow the elevating apron to work in under the bundles. The floating apron suspended in the manner described will have a tendency to reach foward and upwardly over the shock and the reel at the lower end of the apron will rest lightly on the bundles and hold them in an upright position as the shock is carried upward in the machine. In actual practice, while the shocks are moving up the elevator, the frame of the upper apron will be tilted forwardly on the bars 50 under the pressure of the shocks between the aprons and this movement will further tend to direct the upper apron over the shocks to a position where it may grasp the same in much the same manner as the hand of a workman would be used in gathering up the shock by hand. In fact, the aprons are so mounted and so coöperate that their operation in gathering up the shocks without tipping the bundles over very nearly corresponds to hand work.

I do not wish to be confined to any particular means for operating this pick-up mechanism, as various forms of driving devices may be employed therefor, and in many ways the details of construction herein shown and described may be modified and still be within the scope of my invention.

I claim as my invention:

1. A shock loader comprising a wheeled carrying frame, a lower apron frame pivoted therein and forwardly and downwardly inclined, means for counter-balancing said apron frame for tilting forwardly and upwardly upon contact with a shock, a pick-up apron mounted in said frame for working in under the bundles of the shock, an upper apron frame and apron, pivotally supported above said lower frame and mounted to creep forwardly over the tops of the bundles upon engagement of the pick-up apron with the lower portions thereof.

2. A shock loader comprising a wheeled carrying frame, a lower apron frame pivoted thereon and forwardly and downwardly inclined, a pick-up apron mounted in said apron frame and operating near the ground line, said lower frame having freedom of vertical tilting and also having a rotary movement on a longitudinal axis on said carrying frame to adapt itself to inequalities of the ground and the position of the shock, and means supported above said apron frame and apron for reaching forward over the shock and resting upon the tops of the bundles.

3. A shock loader comprising a lower frame and a pick-up apron mounted therein and operating near the ground line, said frame having freedom of vertical tilting and also a rotary movement on a longitudinal axis for adapting itself to the ground and position of the shock, and an upper frame and apron coöperating with said lower frame to overreach and rest lightly upon the top of the shock.

4. A shock loader comprising a wheeled carrying frame, a lower apron frame pivoted thereon and projecting forwardly and downwardly, a pick-up apron mounted in said lower frame, and operating near the ground line, said apron frame having a forward and upward movement on its pivots and a rotary movement on a longitudinal axis with said carrying frame to adapt said pick-up apron to inequalities of the ground and for working it under the shock bundles, and an upper apron frame pivotally supported above said lower apron frame, and an apron mounted in said upper apron frame for reaching forwardly therewith over the tops of the bundles.

5. The combination, with a frame having rear carrying wheels, a forward axle and steering wheels, said axle having standards thereon and a cable attached to said frame and having running connections with said standards across the machine, of a forwardly and downwardly inclined elevating frame pivoted in said carrying frame for rocking therewith on a longitudinal axis and for forward and upward movement on its pivots in said carrying frame, a pick-up apron for said elevating frame and an upper apron frame and apron coöperating with said lower frame and apron and mounted to over-reach and grasp the top of the shock.

6. A shock loader comprising a frame having carrying wheels, a bundle receptacle mounted thereon, an elevating apron frame pivoted on said machine and projecting forwardly and downwardly, a pick-up apron mounted in said elevating frame and operating near the ground line, a distributing apron frame forming a continuation of said elevating frame in the rear of the pivots thereof, an apron carried by said elevating apron frame and overhanging said bundle receptacle and forming with said distributing frame a counter-balance for said elevating frame and permitting it to tilt and ride easily over obstructions, and an upper apron frame and apron mounted to over-reach the top of the shock and coöperate with said elevating apron.

7. A shock loader comprising a frame having carrying wheels, a bundle receptacle, an elevating apron frame pivotally supported and overhanging said receptacle, a distributing frame and apron centrally pivoted in said elevating frame above said receptacle, and means for normally holding it in a substantially horizontal position but permitting it to tilt forwardly or backwardly under the weight of the bundles, an elevating apron mounted in said elevating frame and operating near the ground line and positioned to deliver the bundles to said distributing apron, and an upper apron frame and apron coöperating with said lower frame for grasping the top of the shocks.

8. A shock loader comprising a frame having carrying wheels, a forwardly and downwardly inclined elevating frame pivoted therein, a pick-up apron mounted in said elevating frame and operating near the ground line, an upper apron frame pivoted for forward and upward movement over said elevating apron, an apron mounted in said upper frame and a reel carried by the lower forward portion of said upper frame and encircled by said apron for reaching forwardly over the top of the shocks and resting thereon.

9. A shock loader comprising a frame having carrying wheels, a lower apron frame pivoted therein and forwardly and downwardly inclined, a pick-up apron mounted in said apron frame, an upper apron frame supported above said lower apron frame, an apron mounted in said upper frame for engaging the top of the shock when the lower portion thereof is engaged by said pick-up apron, said upper apron frame being mounted to swing forwardly and upwardly under pressure of the bundles moving between said aprons.

10. The combination, with a wheel carrying frame of a forwardly and downwardly inclined elevator frame pivoted therein and a pick-up apron operating in said elevator frame near the ground line, of an upper frame, an apron mounted in said upper frame, a reel carried by the lower portion of said upper frame and around which said apron passes, the sections of the apron between the slats of said reel lying loosely thereon and said upper frame being mounted to yield upon contact of its apron with the bundles and reach upwardly and forwardly thereover.

11. The combination, with a forwardly and downwardly inclined elevator frame and a pick-up apron operating therein near the ground line, of an upper frame, pivoted bars whereon said upper frame is pivotally supported and free to swing lengthwise therewith, an apron mounted in said upper frame, said pick-up apron working in under the shock and the apron of said upper frame reaching forwardly and upwardly over the shock to rest upon the tops of the bundles.

12. In a shock loader, the wheeled carrying frame, a forwardly and downwardly inclined lower elevating frame, pivoted in said carrying frame, a pick-up apron operating therein near the ground line and mounted to work in under the bundles of a shock, an upper frame and apron positioned above and adjacent to said elevating frame and said upper apron frame and apron being mounted to yield upon contact of the apron with a shock and climb upwardly and forwardly over the bundles, the shock being picked up between the aprons of said frames with the bundles in substantially the same relative position as when on the ground.

13. A shock loader comprising a frame having carrying wheels, a shock receptacle mounted in the rear portion of said frame and having a grain-tight floor, an elevating frame forwardly and downwardly inclined from said receptacle, a pick-up apron mounted in said elevating frame and operating near the ground line and having cross slats thereon and overhanging said shock receptacle to deliver the loose grain shaken out of the bundles to said shock receptacle, and means coöperating with said pick-up apron for holding the shocks thereon during the elevation operation.

14. A shock loader comprising a frame having carrying wheels, a forwardly and downwardly inclined elevating frame and a pick-up apron operating therein for working in under the bundles of a shock to elevate the same, an upper suspended apron frame mounted to swing forwardly and upwardly, an apron mounted in said upper frame and having a part for bearing lightly on the tops of the bundles and holding the shock in an upright position on said elevating apron.

15. A shock loader comprising a frame having carrying wheels, a shock receptacle mounted therein, a lower apron frame pivotally supported in said carrying frame and forwardly and downwardly inclined therein and having a part in the rear of its pivot overhanging said shock receptacle and forming a counter-balance for that portion of said frame in front of its pivot, a pick-up apron mounted in said elevating frame and operating near the ground line, and means above said pick-up apron and coöperating therewith for directing the shocks to said elevating apron.

16. A shock loader comprising a frame having carrying wheels, a shock receptacle mounted therein, a lower elevator frame pivotally supported in said wheeled frame and having a part in the rear of its pivots overhanging said shock receptacle, a distributing means for the shocks mounted in said overhanging part, an elevating apron mounted in the forward portion of said elevating frame and forwardly and downwardly inclined therein, and means for holding the shocks upon said elevating apron.

17. A shock loader comprising a frame having carrying wheels, a shock receptacle mounted therein, an elevating frame pivoted in said carrying frame and having a part overhanging said shock receptacle, a distributing apron mounted in said overhanging part and tilting on a horizontal axis to direct the bundles backwardly or forwardly in said receptacle, the forward portion of said elevating frame being forwardly and downwardly inclined, an elevating apron mounted therein for delivering the shocks to said distributing apron, and means for holding the shocks on said elevating apron.

18. A shock loader comprising a frame having carrying wheels, a shock receptacle mounted therein, an elevating frame pivoted in said carrying frame and forwardly and downwardly inclined, bars projecting rearwardly of the pivots of said elevating frame and overhanging said receptacle, a distributing apron mounted to tilt in said bars and direct the shocks to the front or the rear of said receptacle, said bars and apron forming a counter-balance for said elevating frame, an elevating apron mounted in said elevating frame for gathering up the shocks, and means for holding the shocks on said apron.

19. A shock loader comprising a frame having carrying wheels, an elevating frame forwardly and downwardly inclined therein, an elevating apron mounted in said elevating frame for engaging the lower portions of the shocks, and a floating apron supported above said elevating apron and free to swing forwardly and upwardly and having means for over-reaching the tops of the shocks and holding the bundles in an upright position when they are engaged by said elevating apron.

20. The combination, with a wheeled carrying frame, of a forwardly and downwardly inclined apron frame pivoted thereon, a pick-up apron operating in said frame to work in under the shock of grain and pick up the bundles, and means for counterbalancing said apron frame to cause said frame to contact lightly with the shock and tilt forwardly and upwardly.

21. In a shock loader, an upper apron frame pivotally supported for forward and upward oscillating movement and an apron mounted in said frame for over-reaching the tops of the bundles and resting lightly thereon, and means engaging the lower portions of the bundles and between which and said apron the shocks are held and elevated.

22. The combination, with a wheeled carrying frame, of a forwardly and downwardly inclined gathering frame pivoted thereon, a pick-up device operating in said gathering frame to work in under the shock of grain and pick up the bundles, and means for counter-balancing said gathering frame to cause it to contact lightly with the shock and tilt forwardly and upwardly.

23. In a shock loader, an upper gathering frame pivotally supported for forward and upward oscillating movement and means mounted in said frame for over-reaching the tops of the bundles and resting lightly thereon, and means engaging the lower portions of the bundles and between which and said upper frame the shocks are held and elevated.

24. In a shock loader, a forwardly and downwardly inclined frame pivoted therein, a pick-up device operating to work in under the shock of grain and pick up the bundles, means for counter-balancing said frame to cause said pick-up device to contact lightly with the shock and said frame to tilt forwardly and upwardly, and a floating means supported above said frame for over-reaching the tops of the bundles and resting lightly thereon and between which floating means and said pick-up device the shocks are held and elevated.

25. A shock loader comprising a frame having carrying wheels, a pivoted elevating frame forwardly and downwardly inclined therein, an elevating apron mounted in said elevating frame for engaging the lower portions of the shocks, bars having pivots on said wheeled frame concentric with the pivots of said elevating frame, an upper apron frame having its upper portion pivoted on said bars, flexible means supporting the lower portion of said upper apron frame for forward and upward adjustment thereon, and an apron carried by said upper apron frame and having means for over-reaching the tops of the shocks and holding the bundles in an upright position when they are engaged by said elevating apron.

26. In a shock loader, a bundle receptacle, means for gathering and delivering the bundles to said receptacle, a distributing device having horizontal pivots above said receptacle for tilting forwardly or backwardly therein, a spring for normally holding said distributing device in a substantially horizontal position, and means connected with said distributing device for tilting it on its pivots to deliver the bundles to either end of said receptacle.

27. In a shock loader, a bundle receptacle, means for delivering bundles thereto, a frame having horizontal pivots above said receptacle, a bundle feeding apron operating in said frame, the upper run of said apron moving toward the rear of said receptacle to normally deliver the bundles therein, and means for tilting said frame and raising the rear portion thereof until the bundles roll by gravity from said apron into the forward portion of said receptacle.

28. In a shock loader, a bundle receptacle, means for delivering bundles thereto, a frame having horizontal pivots above said receptacle, a bundle feeding apron mounted in said frame, the upper run of said apron moving toward the rear of said receptacle, springs for normally holding said frame and apron in a substantially horizontal position and means connected with said frame and extending forwardly therefrom for tilting it against the tension of said springs until the bundles deposited on said apron are discharged by gravity into the forward portion of said receptacle.

29. A shock loader comprising a frame having carrying wheels, a shock receptacle mounted therein, a gathering and elevating means mounted in said frame, a distributing frame and apron forming a counterbalance for said gathering and elevating means and overhanging said shock receptacle, said distributing frame being mounted to tilt and direct the bundles into the rear or forward portion of said receptacle, and means for tilting said distributing frame.

In witness whereof, I have hereunto set my hand this 28th day of November 1916.

HENRY HENDERSON.